(12) United States Patent
Gifford et al.

(10) Patent No.: US 9,033,638 B2
(45) Date of Patent: May 19, 2015

(54) OHT ACCESSIBLE HIGH DENSITY STOCKER AND METHOD

(75) Inventors: Jeffrey P Gifford, Fishkill, NY (US);
David J. Pinckney, Newtown, CT (US);
Peter J. Shaffer, Brookfield, CT (US);
Uldis A. Ziemins, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1858 days.

(21) Appl. No.: 11/736,188

(22) Filed: Apr. 17, 2007

(65) Prior Publication Data

US 2008/0260504 A1 Oct. 23, 2008

(51) Int. Cl.
*H01L 21/677* (2006.01)
*B65G 1/12* (2006.01)

(52) U.S. Cl.
CPC . *B65G 1/12* (2013.01); *Y10S 414/14* (2013.01)

(58) Field of Classification Search
USPC .............................. 414/411, 217, 331.02, 940
See application file for complete search history.

(56) References Cited

U.S. PATENT DOCUMENTS

| | | | |
|---|---|---|---|
| 4,820,101 A | 4/1989 | Fenn | |
| 5,527,390 A * | 6/1996 | Ono et al. | 118/719 |
| 5,655,869 A * | 8/1997 | Scheler et al. | 414/222.01 |
| 6,364,592 B1 | 4/2002 | Hofmeister | |
| 6,379,096 B1 | 4/2002 | Beutler et al. | |
| 6,443,686 B1 | 9/2002 | Wiesler et al. | |
| 6,540,466 B2 | 4/2003 | Bachrach | |
| 6,726,429 B2 | 4/2004 | Sackett et al. | |
| 6,784,003 B2 | 8/2004 | Sun et al. | |
| 6,884,989 B2 | 4/2005 | Murata | |
| 7,039,499 B1 | 5/2006 | Nasr et al. | |
| 7,134,826 B2 * | 11/2006 | Mitsuyoshi | 414/222.01 |
| 2004/0049398 A1 | 3/2004 | Gartland et al. | |
| 2004/0109746 A1 | 6/2004 | Suzuki | |
| 2004/0149672 A1 | 8/2004 | Motoori et al. | |
| 2005/0075748 A1 | 4/2005 | Gartland et al. | |
| 2006/0051188 A1 | 3/2006 | Hoshino | |
| 2006/0051192 A1 | 3/2006 | Fujiki | |
| 2006/0182553 A1 | 8/2006 | Yamamoto et al. | |
| 2006/0237525 A1 | 10/2006 | Sone | |

* cited by examiner

*Primary Examiner* — Saul Rodriguez
*Assistant Examiner* — Willie Berry, Jr.
(74) *Attorney, Agent, or Firm* — William Steinberg; Roberts Mlotkowski Safran & Cole, P.C.

(57) ABSTRACT

A storage system for items such as substrate carriers includes at least one stocker including a plurality of storage areas each adapted to store at least one storage device. At least one movable support is arranged on the at least one stocker. A control controls movement of the at least one movable support at least between a first position wherein the at least one movable support receives the at least one storage device outside one of the storage areas and a second position wherein the at least one movable support is arranged substantially within the one of the storage areas.

24 Claims, 16 Drawing Sheets

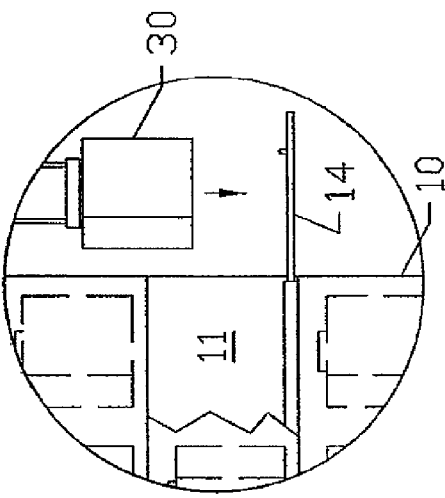
FIG. 14
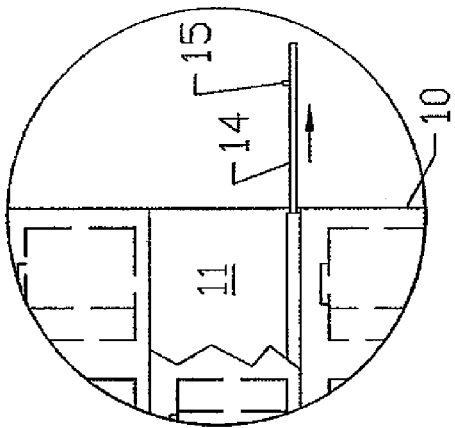
FIG. 15
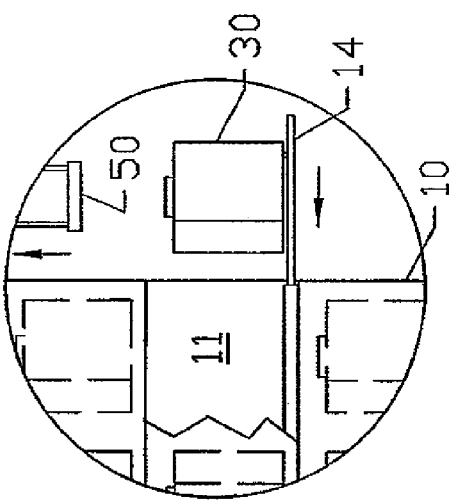
FIG. 16
FIG. 17

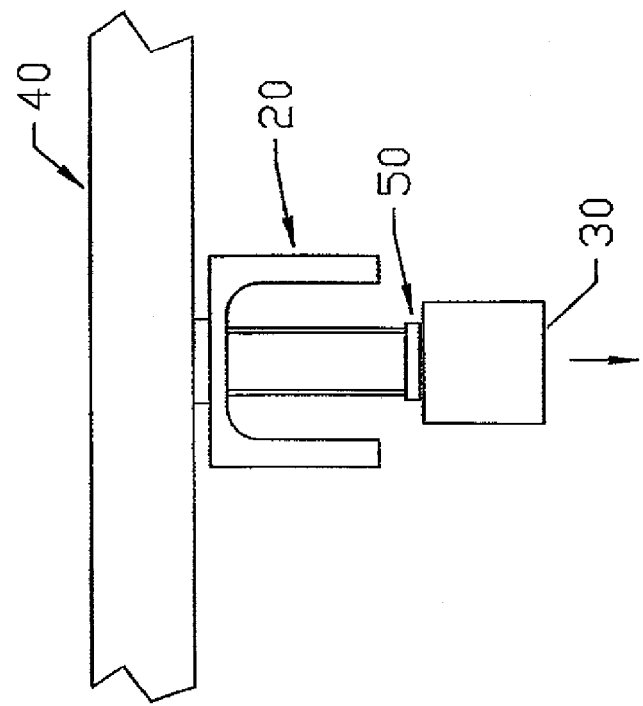
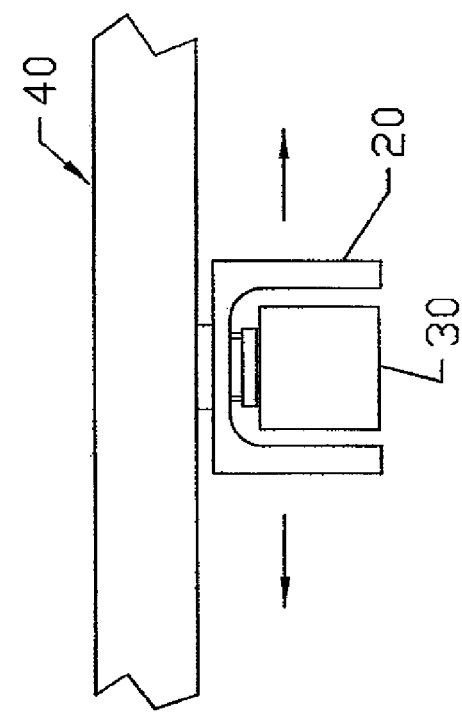

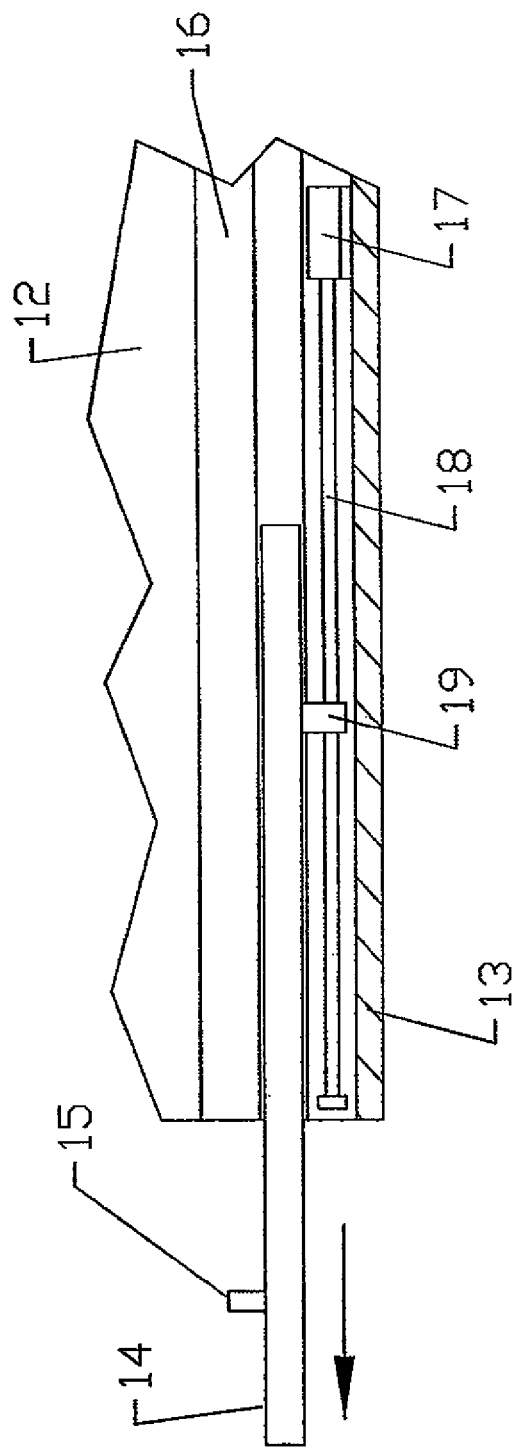

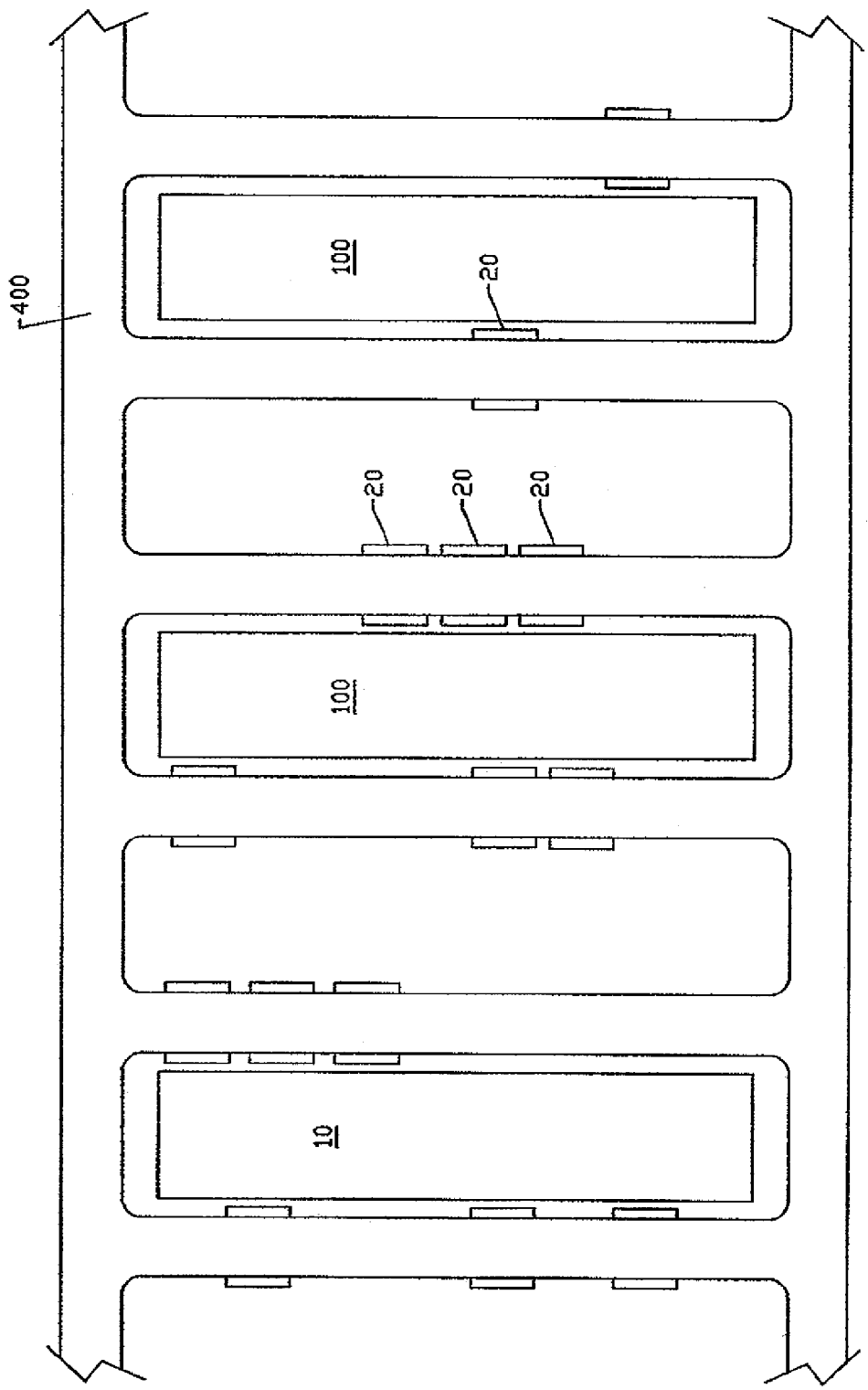

OHT ACCESSIBLE HIGH DENSITY STOCKER AND METHOD

FIELD OF THE INVENTION

The invention generally relates to an overhead traveling vehicle or transporter (OHT) accessible high density stocker and/or storage buffer system and a method of storing devices such as substrate carriers using the OHT accessible high density stocker or the storage buffer system.

BACKGROUND OF THE INVENTION

Storage to floor space ratio in a semiconductor factory requires a high density storage system. Known systems utilize an overhead transporter to transfer substrate carriers to stockers and a robotic system to then transfer the substrate carriers from the overhead transporters to storage areas in a stocker. The robotic system typically includes a large multi-axis robotic mechanism which, among other things, takes up valuable storage space.

Semiconductor factories require highly efficient storage for work in progress (WIP) to maximize their return on capital investment. Existing storage solutions of the type discussed above waste valuable storage space and typically require three main steps to store a container: (1) OHT to conveyor; (2) conveyor to crane; and (3) crane to shelf.

What is needed is a simple, reliable, and/or cost effective system and one which will increase substrate carrier storage per square foot more than is available with current systems.

SUMMARY OF THE INVENTION

In a first aspect of the invention, a storage system for items such as substrate carriers includes at least one stocker including a plurality of storage areas each adapted to store at least one storage device. At least one movable support is arranged on the at least one stocker. A control controls movement of the at least one movable support at least between a first position wherein the at least one movable support receives the at least one storage device outside one of the storage areas and a second position wherein the at least one movable support is arranged substantially within the one of the storage areas.

In a second aspect of the invention, an overhead transporter accessible storage system includes at least one stocker includes a plurality of storage areas each adapted to store at least one storage device. At least one movable support shelf is arranged on the at least one stocker. A control controls movement of the at least one movable support shelf at least between a first position wherein the at least one movable support receives the at least one storage device outside one of the storage areas and a second position wherein the at least one movable support shelf is arranged substantially within the one of the storage areas.

In a third aspect of the invention, a method of storing storage devices such as substrate carriers includes transferring at least one storage device from at least one overhead transporter to a stocker having a plurality of storage areas and at least one movable support and controlling a movement of the at least one movable support at least between a first position wherein the at least one movable support receives the at least one storage device outside one of the storage areas and a second position wherein the at least one movable support is arranged substantially within the one of the storage areas.

BRIEF DESCRIPTION OF THE DRAWINGS

FIGS. 14-17 show partial side views of the stocker of FIG. 1 and demonstrate another non-limiting way in which an overhead transporter can transfer the substrate carrier to a movable shelf and how the movable shelf receives the substrate carrier and then moves into a storage area of the stocker;

FIGS. 22-23 show partial side views illustrating how an overhead transporter can move relative to a running rail and how it stores and transfers the substrate carrier;

FIGS. 28 and 29 show partial front and a side cross-section views of one non-limiting way in which movable shelf can be mounted and moved within a storage area of a stocker; and FIG. 30 shows a top view of a buffer system made up of multiple rows of stockers which receive and store substrate carriers via multiple overhead transporters movably guided on a running rail system.

DETAILED DESCRIPTION OF EMBODIMENTS OF THE INVENTION

Figure 2:
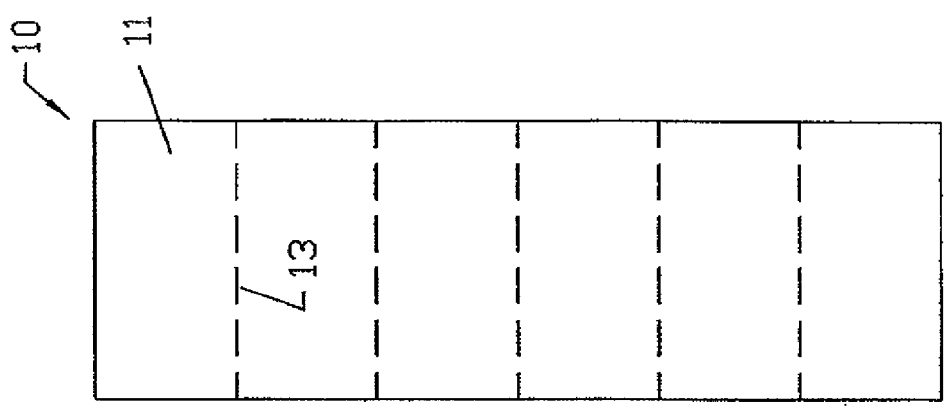
FIG. 2 shows a side view of the stocker of FIG. 1.

The invention generally provides for an overhead traveling vehicle or transporter (OHT) accessible high density stocker and/or storage buffer system and a method of storing devices such as substrate carriers using the OHT accessible high density stocker or the storage buffer system.

The present invention aims to increase substrate carrier storage per square foot by 50% or more from current levels. Substrate carriers are also known as front opening unified pods (FOUPs), standard mechanical interface (SMIF) pods, and cassettes. The invention also provides a simplified system for the storage and retrieval of high value products. Highly reliable systems are necessary in an automated handling system to sustain production requirements.

The present invention also provides extremely high WIP storage ratio by, among other things, being able to store, e.g., 5 or more FOUPs per square foot versus two or less per foot in conventional stockers (for 15 foot ceiling fabrication). The invention also eliminates storage steps versus conventional systems and is therefore faster by e.g., eliminating the stocker robot/crane and Input/Output (I/O) conveyors. FOUPs can be delivered directly from the OHT to the storage shelf. Furthermore, multiple FOUPs can be stored/retrieved simultaneously. The invention also uses simple pneumatic or electric drives to move the storage shelves.

The present invention additionally eliminates confined space for service personnel by allowing all of the FOUPs to be accessible from outside. The system allows for easy visual inventory check by allowing all of the FOUPs to be visible from outside of the stocker. According to the invention, the stocker can be made longer and have virtually an unlimited length and is not limited by any requirements regarding stocker crane cabling, etc. The invention also allows for a modular design or configuration of the stocker and is configurable for use in high density stocker farms. It can also effectively use space between the stockers for added efficiency.

The present invention utilizes a multi shelved storage device or stocker. The shelves extend and retract out and with the stocker and provide high storage density and speed. The shelf levels can be arranged on opposite sides of the stocker. Utilizing the system of the present invention can be advantageous since it need not require any large multi axis robotic mechanisms or systems.

The present invention utilizes OHT hoisting capability, automated shelves that extended to an open position, and which become a loadport for the OHT. The efficient utilization of space provided by the invention allows for between about 50% and up to about 100% increase in storage to floor space ratio. Furthermore, the added flexibility of having multiple loading areas (e.g., four output loadports or more) in the same area that previously utilized, e.g., two. The invention can also eliminate or minimize the crane and conveyor cycle time of obtaining a FOUP by up to, e.g., 30 seconds or more. Additionally, an OHT rail can be located between two stocker shelves, for example, which open and close to allow FOUPs to be stored and picked up by the OHT vehicles or carriages.

Figure 1:
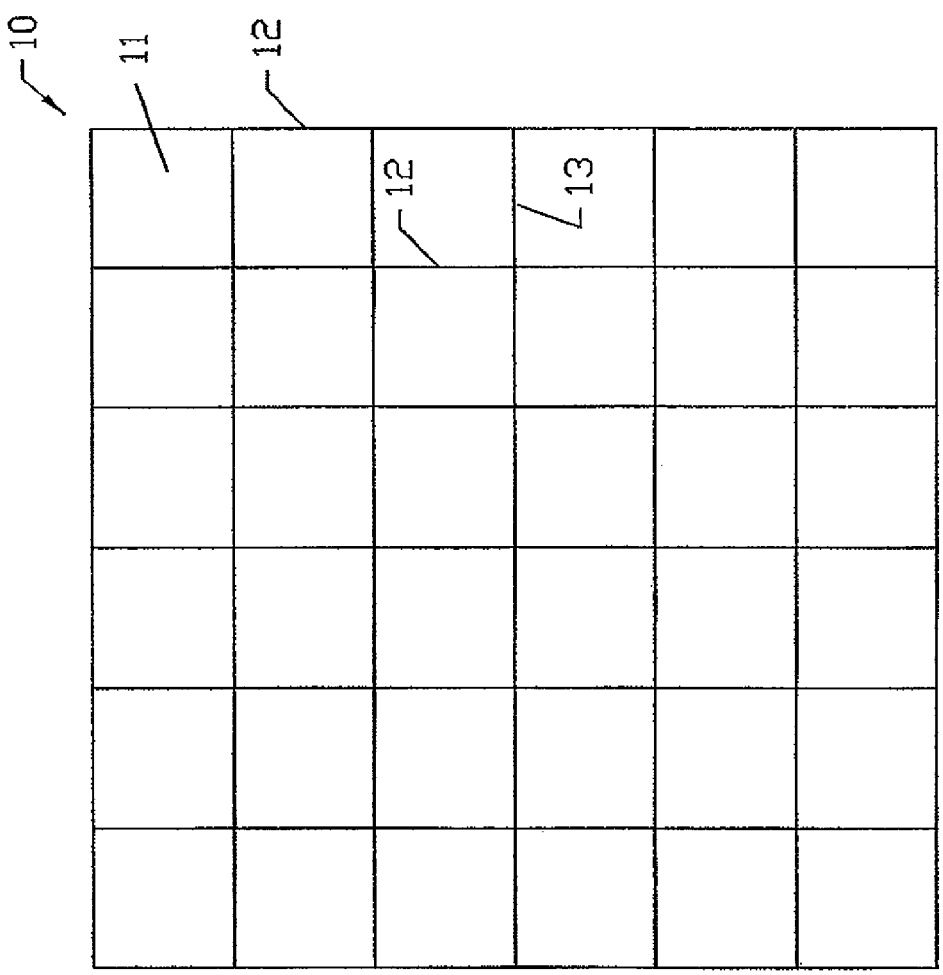
FIG. 1 shows a front view of a first embodiment of a stocker utilizing rows and columns of storage areas.

FIGS. 1 and 2 show a first non-limiting embodiment of a stocker 10. The stocker 10 has a plurality of storage areas 11 which are arranged in rows and columns formed by vertical sidewalls 12 and horizontal floor walls 13. The stocker 10 can be made of any material and have a size which corresponds to conventional stockers. Each storage space 11 is open to one of the sides which will receive the substrate carriers 30 (see FIGS. 3-5). Preferably, each side of the stocker 10 can be accessed by and receive therein the substrate carriers 30.

Figure 3:
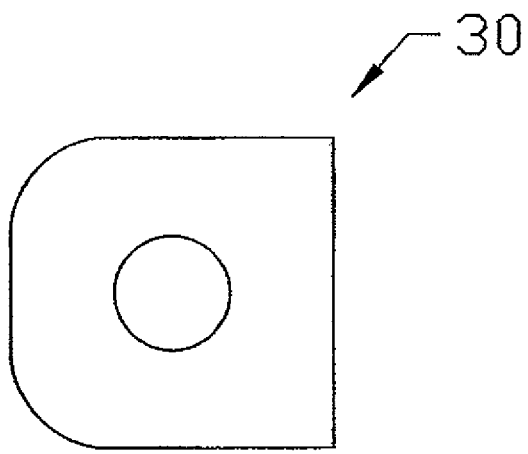
FIGS. 3-5 show a top, side and bottom views, respectively, of a substrate carrier.
Figure 4:
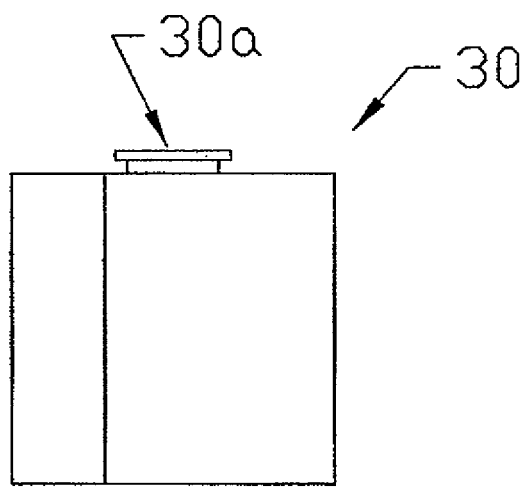
Figure 5:
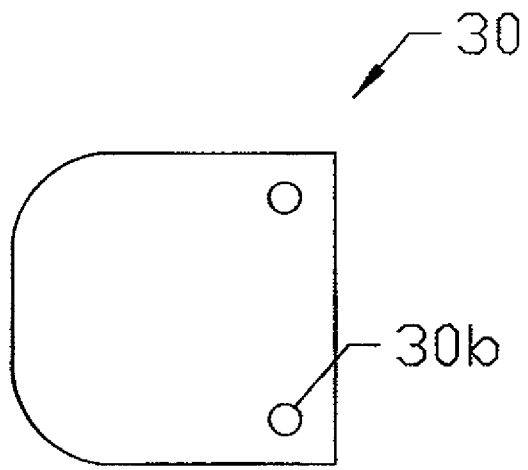

Referring to FIGS. 3-5, the substrate carrier 30, a.k.a., front opening unified pods (FOUPs), standard mechanical interface (SMIF) pods, and cassettes, can be of any conventional type and preferably include an upper gripable portion 30a, an interior space which stores plural substrates or wafers (not shown), and one or more positioning mechanisms 30b arranged on a bottom surface, e.g., recesses, which mate with or engage with corresponding positioning mechanism 15 on the shelves 14 (see FIGS. 6-7) of the stocker 10.

Figure 6:
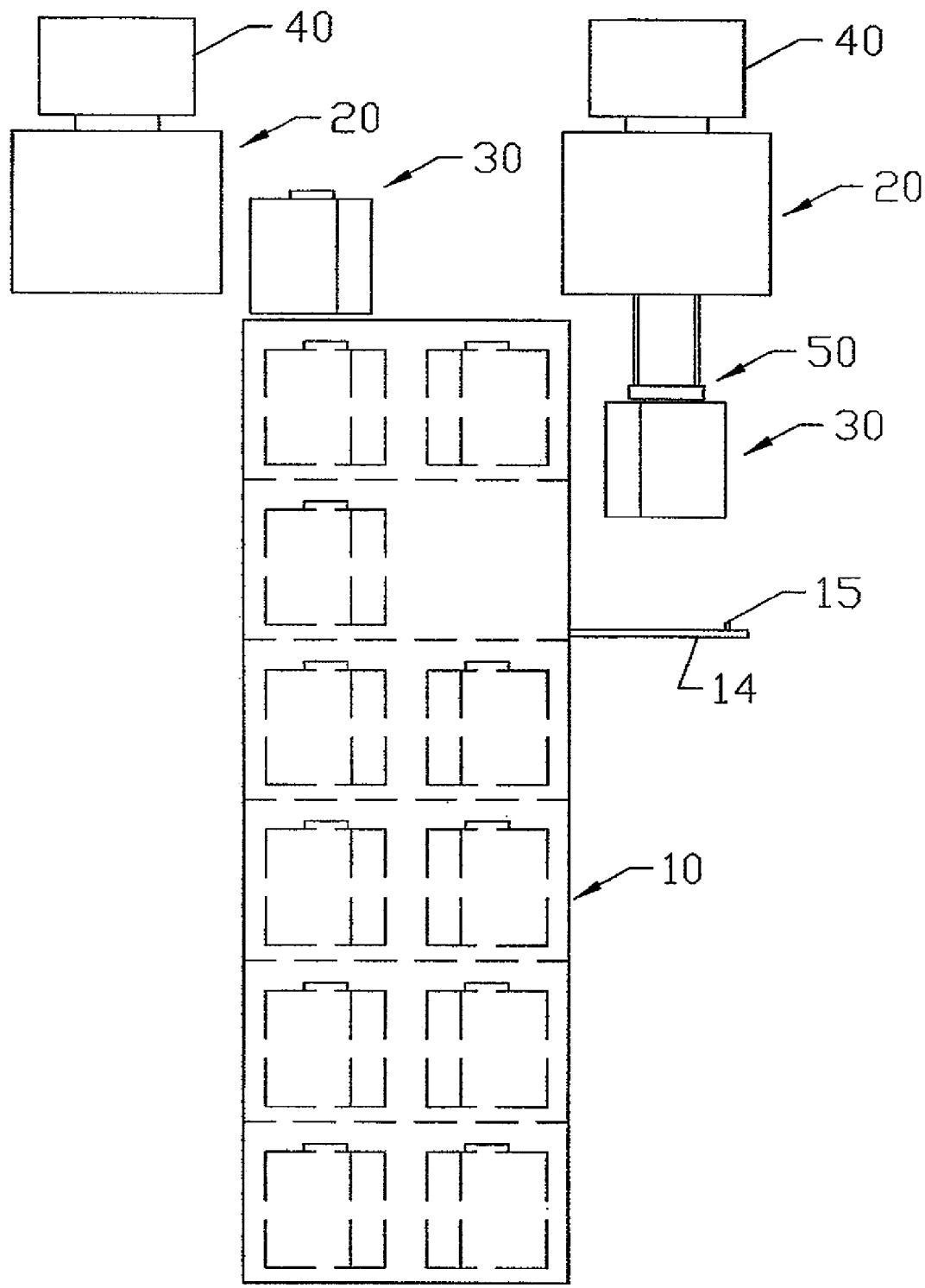
FIG. 6 shows a side view of the stocker of FIG. 1 arranged between an overhead transferring system that utilizes a traveling or running rail system and multiple overhead transporters each having an end effector which transfers the substrate carriers to the movable shelves of the stocker.
Figure 7:
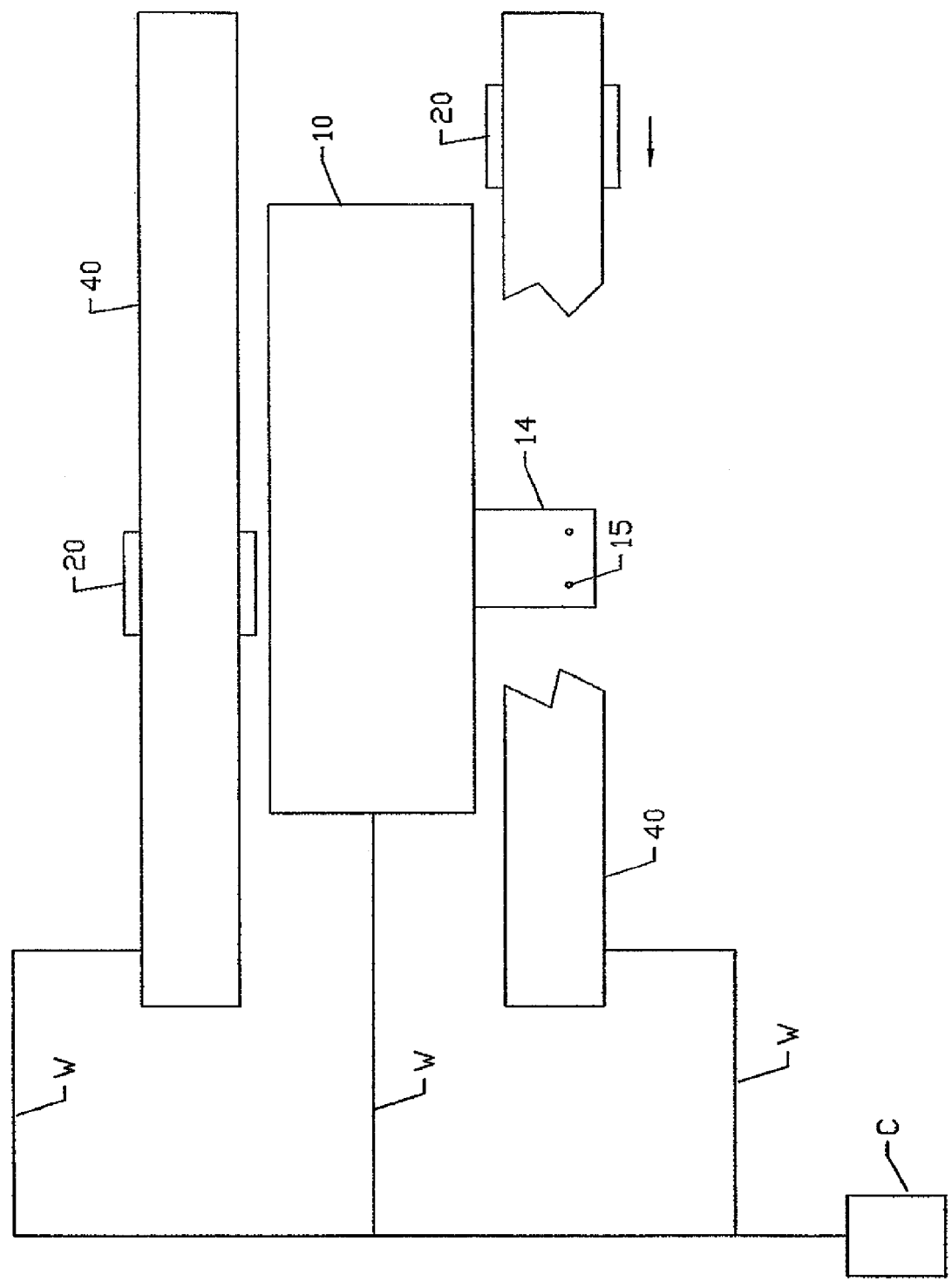
FIG. 7 shows a top view of the system of FIG. 6 and illustrates a control that controls movement of the multiple overhead transporters and the movable shelves of the stocker.

FIGS. 6 and 7 show the stocker 10 of FIG. 1 arranged in a buffer system which utilizes multiple overhead transporters 20 which are movably mounted and guided by rails 40. The overhead transporters 20 access each side of the stocker 10 and preferably includes an end effector 50 which releasably grips the upper portion 30a of the substrate carrier 30.

FIG. 6 shows a left-side overhead transporter 20 having already positioned a substrate carrier 30 on a top surface of the stocker 10 and a right-side overhear transporter 20 lowering a substrate carrier 30 onto an extended shelf 14 of the stocker 10. One or more positioning mechanisms 15, e.g., projections or pins, are preferably arranged on an upper surface of the shelves 14 which are configured to mate with or engage with corresponding positioning mechanism 30b (see FIG. 5) on the substrate carriers 30. The positioning mechanisms 15 can preferably be kinematic locating pins. The mechanisms 15 and 30b are preferably utilized to ensure that the substrate carriers 30 are properly and/or non-movably positioned on the shelves 14.

With reference to FIG. 7, a control C is connected (e.g., electrically via wires W or wirelessly) to devices (e.g., motors, actuators, drives, etc,.) which cause the shelves 14 to move into and out of the storage areas 11 (see FIG. 6) and the overhead transporters 20 in order to control or coordinate the transfer of the substrate carriers 30 (see FIG. 6) from the overhead transporters 20 to the shelves 14 and into the storage areas 11. The control "C: is preferably a computer system which utilizes hardware and software to control these movements. The control C is also preferably connected to a process control computer system so that the stocker 10 can be utilized as part of an substrate processing system or facility.

Figure 8:
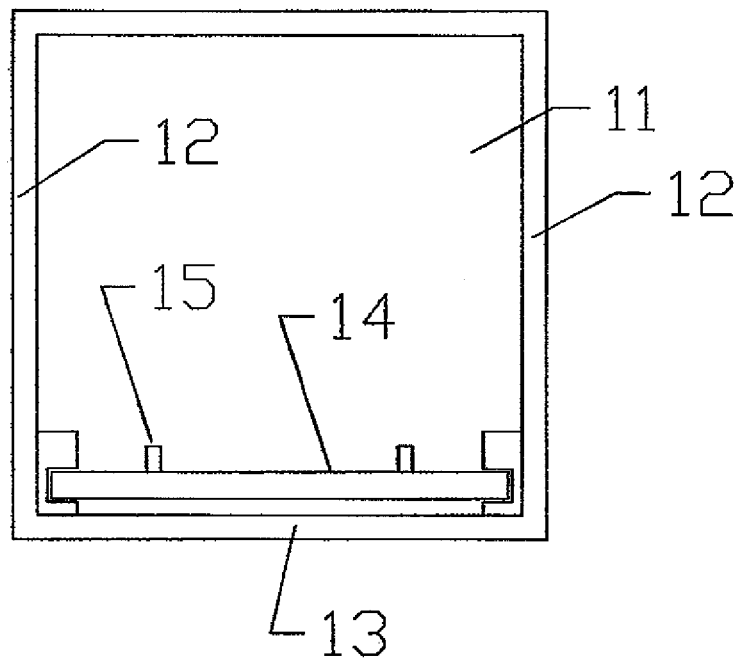
FIG. 8 shows a front view of one of the storage areas of the stocker of FIG. 1 and illustrates one non-limiting way in which a movable shelf can be arranged or mounted therein.
Figure 9:
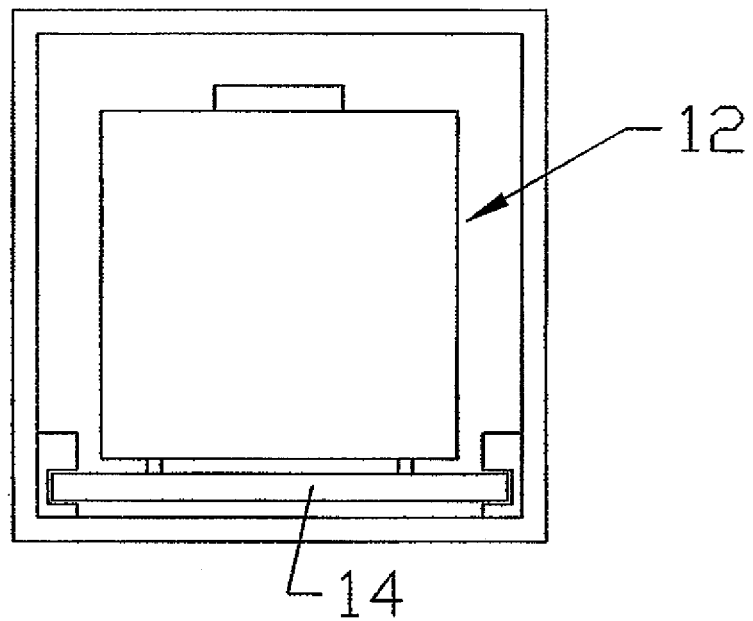
FIG. 9 shows a front view of the storage area of FIG. 8 after a substrate carrier is positioned therein by the movable shelf.

FIGS. 8 and 9 show the details of one of the storage areas 11 of the stocker 10 of FIG. 1. FIG. 8 shows an empty storage area 11 utilizing opposite vertical sides walls 12, a bottom wall 13, oppositely arranged guides 16, and a shelf 14 utilizing positioning pins 15. The guides 16 can be of any conventional type and function to linearly guide the generally horizontal movement of the shelf 14 between a position wherein the shelf 14 is entirely or substantially arranged within the storage area 11 and an extended position wherein a significant portion to an entire portion of the shelf 14 is arranged outside of the storage area 11 (see FIGS. 6 and 7) in order to receive a substrate carrier 30 from the overhead transporter 20 and/or allow the overhead transporter 20 to remove the substrate carrier 30 from the movable shelf 14. Although not shown, the shelf can also be a lazy-susan type shelf that would turn out on a bearing assembly and/or can be rotated out on a piston mechanism. This arrangement would allow for less moving parts. FIG. 9 shows a front view of the storage area of FIG. 8 after a substrate carrier 30 is positioned therein by the movable shelf.

Figure 10:
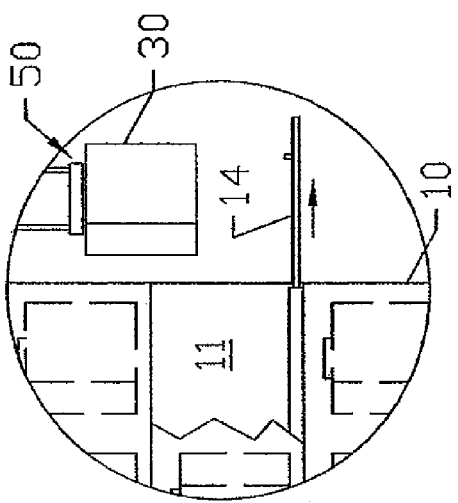
FIGS. 10-13 show partial side views of the stocker of FIG. 1 and demonstrate one non-limiting way in which an overhead transporter can transfer the substrate carrier to a movable shelf and how the movable shelf receives the substrate carrier and then moves into a storage area of the stocker.

FIGS. 10-13 show partial side views of the stocker 10 of FIG. 1 and demonstrate one non-limiting way in which an overhead transporter can transfer the substrate carrier 30 to a movable shelf 14 and how the movable shelf 14 receives the substrate carrier 30 and then moves into a storage area 11 of the stocker 10. In FIG. 10, the end effector 50 of the overhead transporter is being lowered and a movable shelf 14, which has been designated by the control C (not shown in FIGS. 10-13) to receive the substrate carrier 30, is shown in a retracted position.

Figure 11:
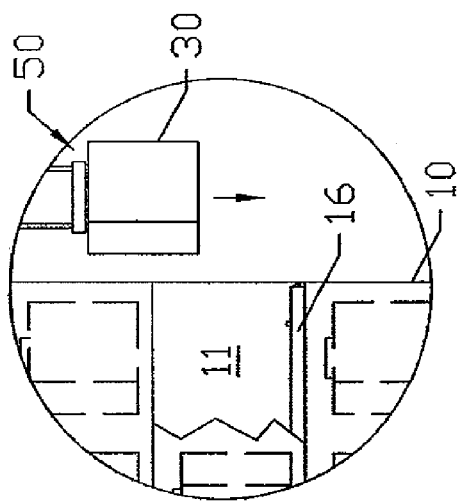
Figure 13:
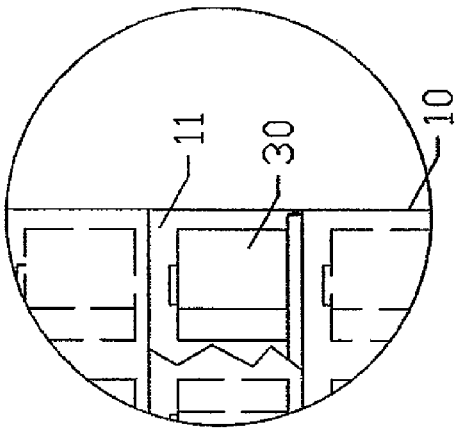
Figure 12:
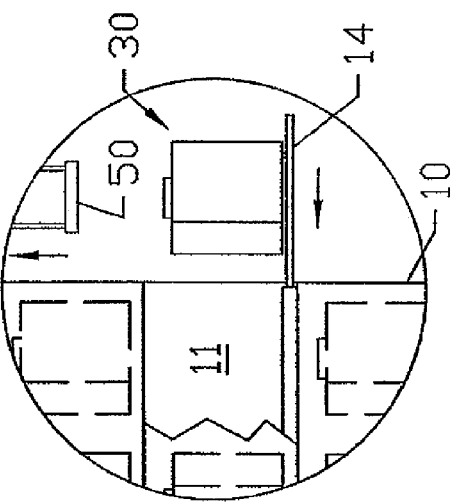

In FIG. 11, the end effector 50 of the overhead transporter has been lowered further and the designated movable shelf 14 has moved to an extended position so as to receive the substrate carrier 30. In FIG. 12, the end effector 50 of the overhead transporter has been lowered further to the point that it positions the substrate carrier 30 properly on the movable shelf 14. In FIG. 13, the end effector 50 of the overhead transporter has been raised and the designated movable shelf 14 has moved to the retracted position in order to place the substrate carrier 30 substantially completely within the designated storage area 11.

Engagement between the positioning mechanisms 15 and 30b occurs in FIG. 12 and ensures that the substrate carrier 30 is securely mounted to the shelf 14. Positioning of the substrate carrier 30 on the movable shelf 14 using mechanisms 15 and 30b can also prevent the substrate carrier from moving along at least one degree of freedom. Positioning the substrate carrier 30 on the movable shelf 14 using mechanisms 15 and 30b can additionally prevent the substrate carrier 30 from moving substantially parallel to an upper surface of the shelf 14. Finally, positioning the substrate carrier 30 on the movable shelf 14 using mechanisms 15 and 30b can ensure that the substrate carrier 30 is removably secured to an upper surface of the movable shelf 14.

FIGS. 14-17 show partial side views of the stocker 10 of FIG. 1 and demonstrate another non-limiting way in which an overhead transporter can transfer the substrate carrier 30 to a movable shelf 14 and how the movable shelf 14 receives the substrate carrier 30 and then moves into a storage area 11 of the stocker 10. In FIG. 14, prior to the end effector 50 of the overhead transporter is lowered, a movable shelf 14, which has been designated by the control C (not shown in FIGS. 14-17) to receive the substrate carrier 30, moves to an extended position. In FIG. 15, the end effector 50 of the overhead transporter has been lowered towards the designed shelf 14, which will receive the substrate carrier 30. In FIG. 16, the end effector 50 of the overhead transporter has positioned the substrate carrier 30 properly on the movable shelf 14 and has started moving upwards. In FIG. 17, the designated movable shelf 14 has moved to the retracted position in order to place the substrate carrier 30 substantially completely within the designated storage area 11.

Figure 18:
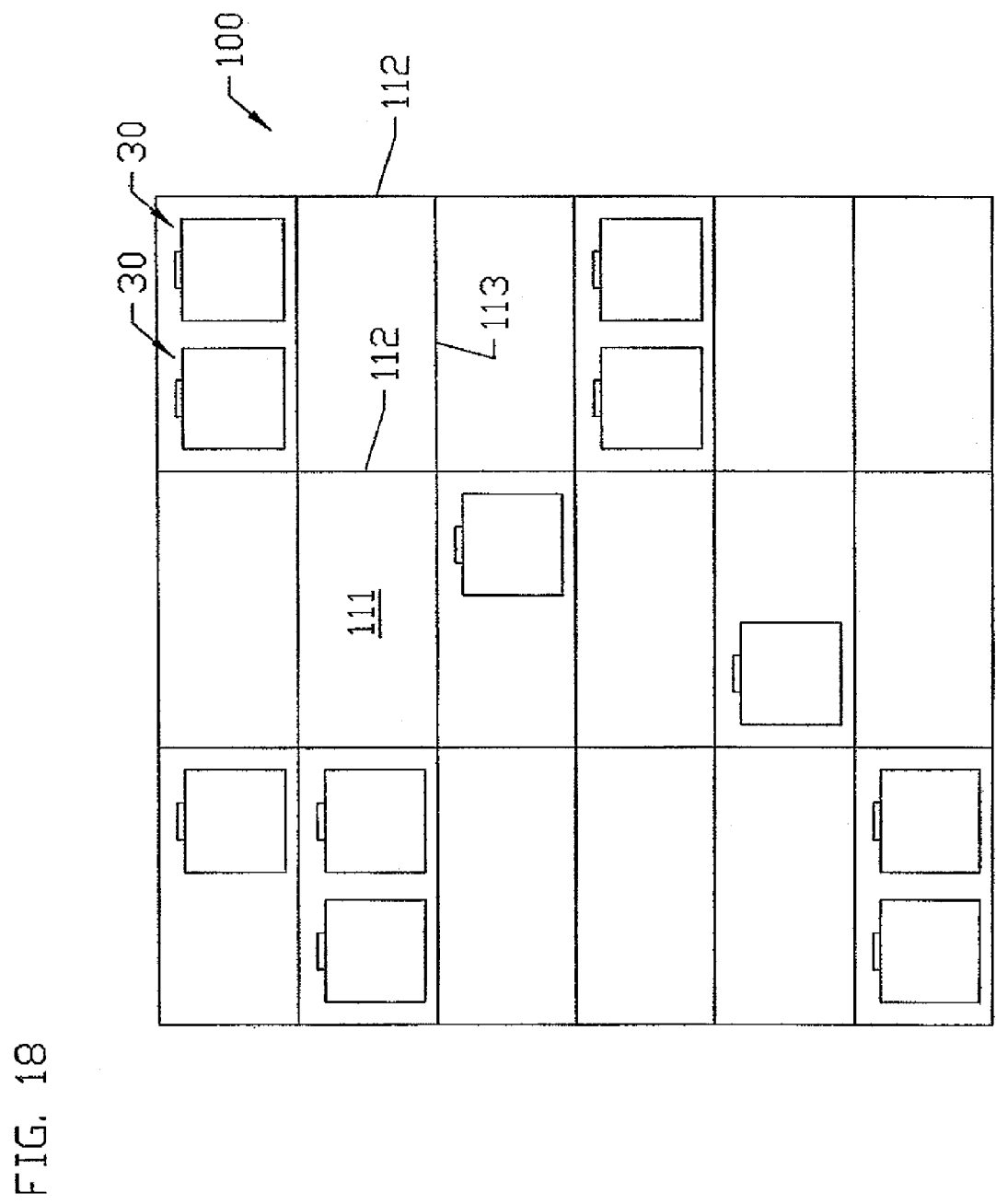
FIG. 18 shows a front view of a second embodiment of a stocker utilizing rows and columns of storage areas.

FIG. 18 shows a second non-limiting embodiment of a stocker 100. Some of the storage areas are shown empty, other storage areas are shown to contain a single substrate carrier, while still other storage areas are shown storing plural substrate carriers. The stocker 100 has a plurality of storage areas 111 which are arranged in rows and columns formed by vertical sidewalls 112 and horizontal floor walls 113. As was the case in the previous embodiment, the stocker 100 can be made of any material and have a size which corresponds to conventional stockers. Each storage space 111 is open to one of the sides of the stocker 100 and is sized to receive plural, e.g., two, substrate carriers 30. Preferably, each side of the stocker 100 can be accessed by and receive therein the substrate carriers 30 (see, e.g., FIG. 19). Some of the storage areas 111 are shown empty, other storage areas 111 are shown to contain a single substrate carrier 30, while still other storage areas 111 are shown storing plural substrate carriers 30. The control C or the process computer system can store information regarding the current position of each substrate carrier 30 and where in the stocker 100 each specific substrate carrier 30 is stored. This is also the case for the previous embodiment.

Figure 19:
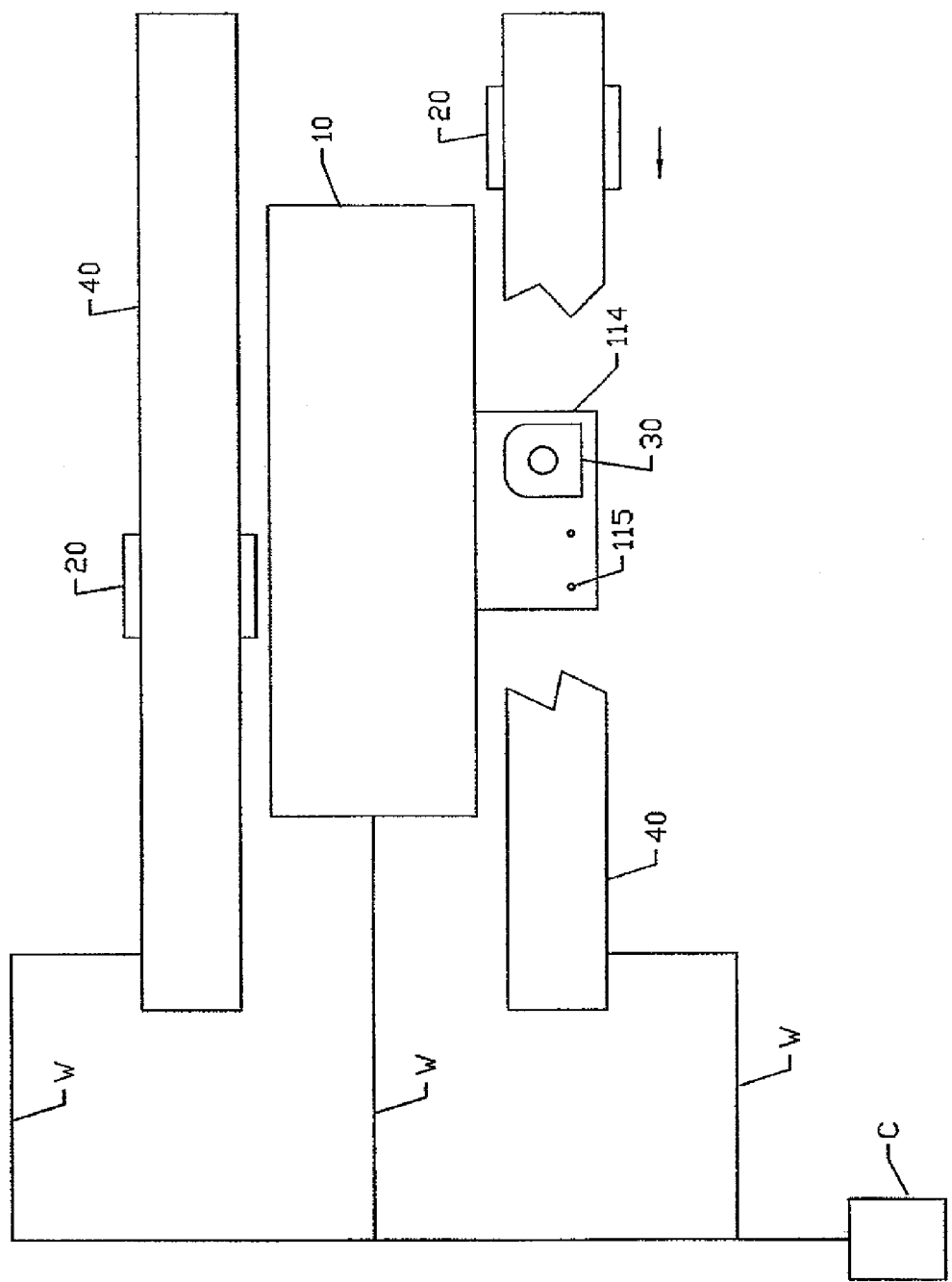
FIG. 19 shows a top view of the system of FIG. 7 utilizing the stocker of FIG. 18.

FIG. 19 shows the stocker 100 of FIG. 18 arranged in a buffer system which utilizes multiple overhead transporters 20 which ore movably mounted and guided by rails 40. As in the previous embodiment, the overhead transporters 20 access each side of the stocker 100 and preferably includes an end effector which releasably grips the upper portion of the substrate carrier 30. FIG. 19 shows a right-side overhear transporter 20 moving toward a position over an extended shelf 114 supporting one substrate carrier 30. As in the previous embodiment, one or more positioning mechanisms 115, e.g., projections or pins, are preferably arranged on an upper surface of the shelves 114 which are configured to mate with or engage with corresponding positioning mechanism 30b on the substrate carriers 30. The mechanisms 115 and 30b are preferably utilized to ensure that the substrate carriers 30 are properly and/or non-movably positioned on the shelves 114.

With further reference to FIG. 19, as in the previous embodiment, a control C is connected (e.g., electrically via wires W or wirelessly) to devices (e.g., motors, actuators, drives, etc,.) which cause the shelves 114 to move into and out of the storage areas 111 and the overhead transporters 20 in order to control or coordinate the transfer of the substrate carriers 30 from the overhead transporters 20 to the shelves 114 and into the storage areas 111. The control C is preferably a computer system which utilizes hardware and software to control these movements. The control C is also preferably connected to a process control computer system so that the stocker 100 can be utilized as part of an substrate processing system or facility.

Figure 20:
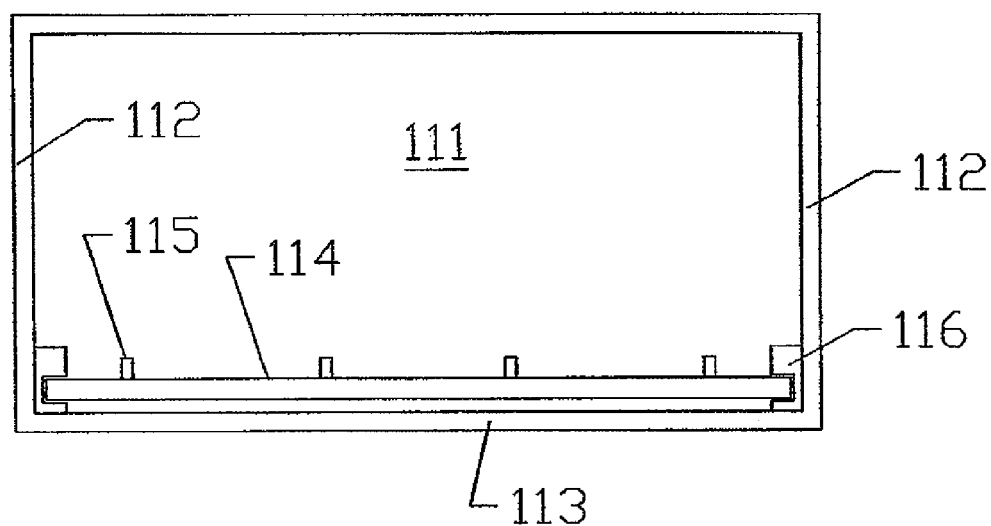
FIG. 20 shows a front view of one of the storage areas of the stocker of FIG. 18 and illustrates one non-limiting way in which a movable shelf can be arranged or mounted therein.
Figure 21:
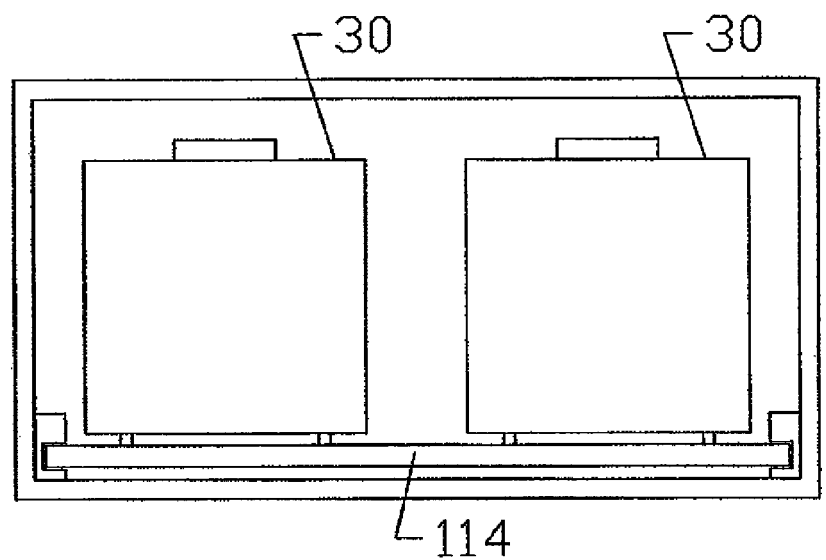
FIG. 21 shows a front view of the storage area of FIG. 20 after plural substrate carriers are positioned therein by the movable shelf.

FIGS. 20 and 21 show the details of one of the storage areas 111 of the stocker 100 of FIG. 18. FIG. 20 shows an empty storage area 111 utilizing opposite vertical sides walls 112, a bottom wall 113, oppositely arranged guides 116, and a shelf 114 utilizing positioning pins 115. In contrast to the previous embodiment, the instant embodiment utilizes storage areas 111, which can store plural substrate carriers 30, and shelves 114, which can support plural substrate carriers 30. As was the case in the previous embodiment, the guides 116 can be of any conventional type and function to linearly guide the generally horizontal movement of the shelf 114 between a position wherein the shelf 114 is entirely or substantially arranged within the storage area 111 and an extended position wherein a significant portion to an entire portion of the shelf 114 is arranged outside of the storage area 111 (see FIG. 19) in order to receive a substrate carrier 30 from the overhead transporter 20 and/or allow the overhead transporter 20 to remove the substrate carrier 30 from the movable shelf 114.

FIGS. 22 and 23 show partial side views illustrating how the overhead transporter 20 can move relative to a running rail 40 and how it temporarily stores and transfers a substrate carrier 30 to stockers (not shown).

Figure 24:
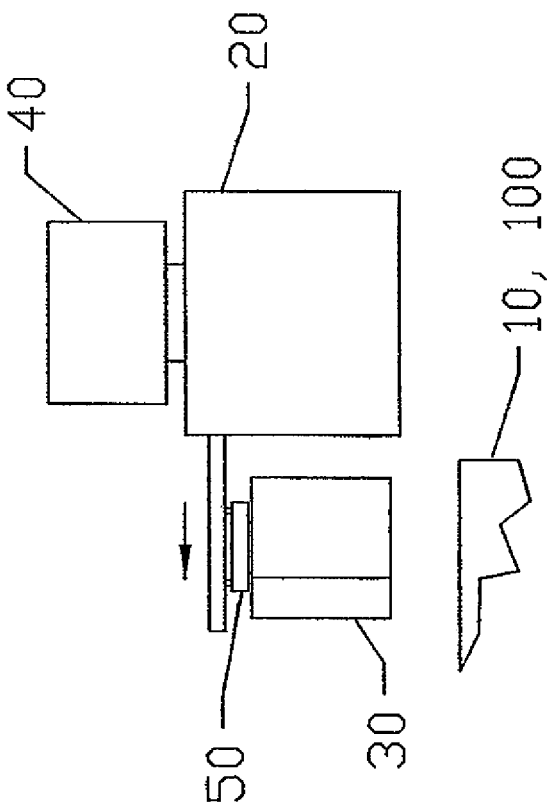
FIGS. 24-27 show partial side views illustrating how an overhead transporter can transfer the substrate carrier to a top surface of a stocker.
Figure 25:
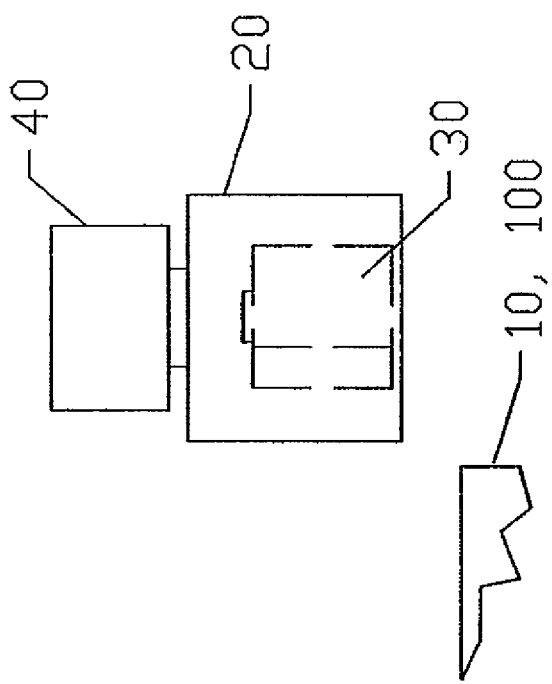
Figure 27:
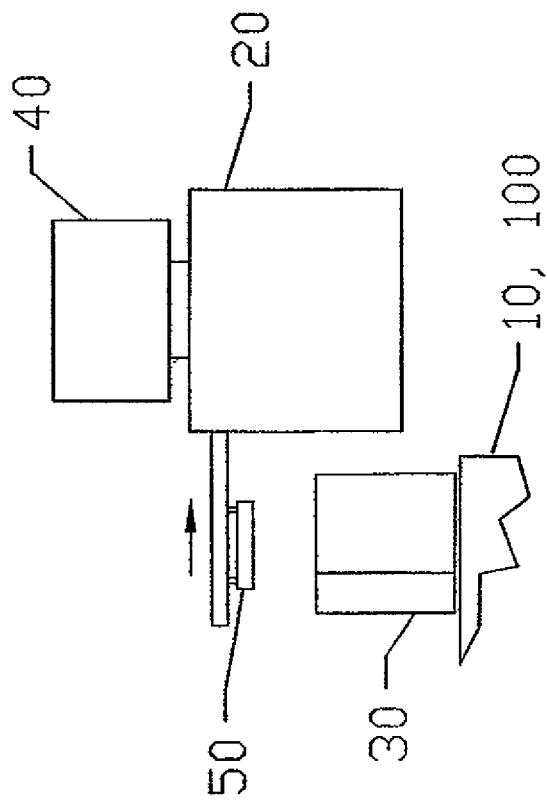
Figure 26:
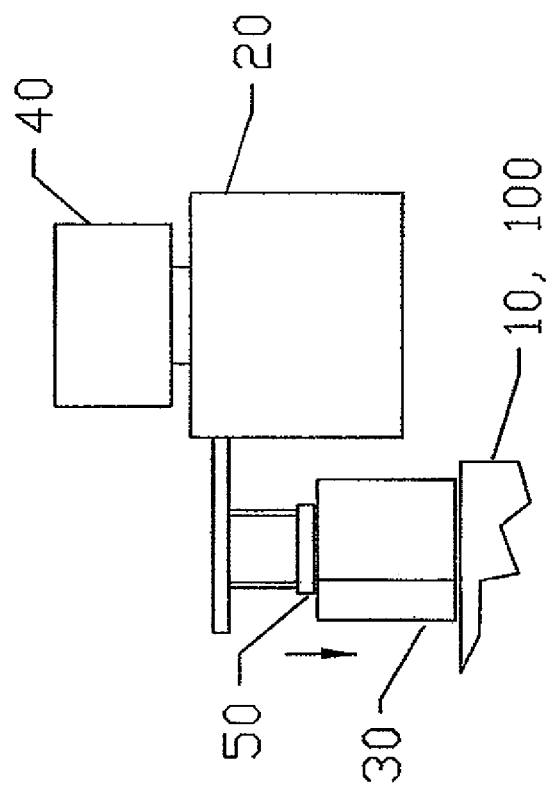

FIGS. 24-27 show partial side views illustrating how an overhead transporter 20 can transfer the substrate carrier 30 to a top surface of a stocker 10, 100. In FIG. 24, the end effector 50 of the overhead transporter 20 is in a retracted position and the substrate carrier 30 is positioned within the overhead transporter 20. In FIG. 25, the end effector 50 of the overhead transporter 20 has been moved horizontally and positioned the substrate carrier 30 over a designated position on the stocker 10, 100. In FIG. 26, the end effector 50 of the overhead transporter 20 has been lowered to the point that it positions the substrate carrier 30 properly on top of the stocker 10, 100. In FIG. 27, the end effector 50 of the overhead transporter 20 has disconnected from the substrate carrier, moved to the raised position, and is moving back into the overhead transporter 20.

Figure 28:
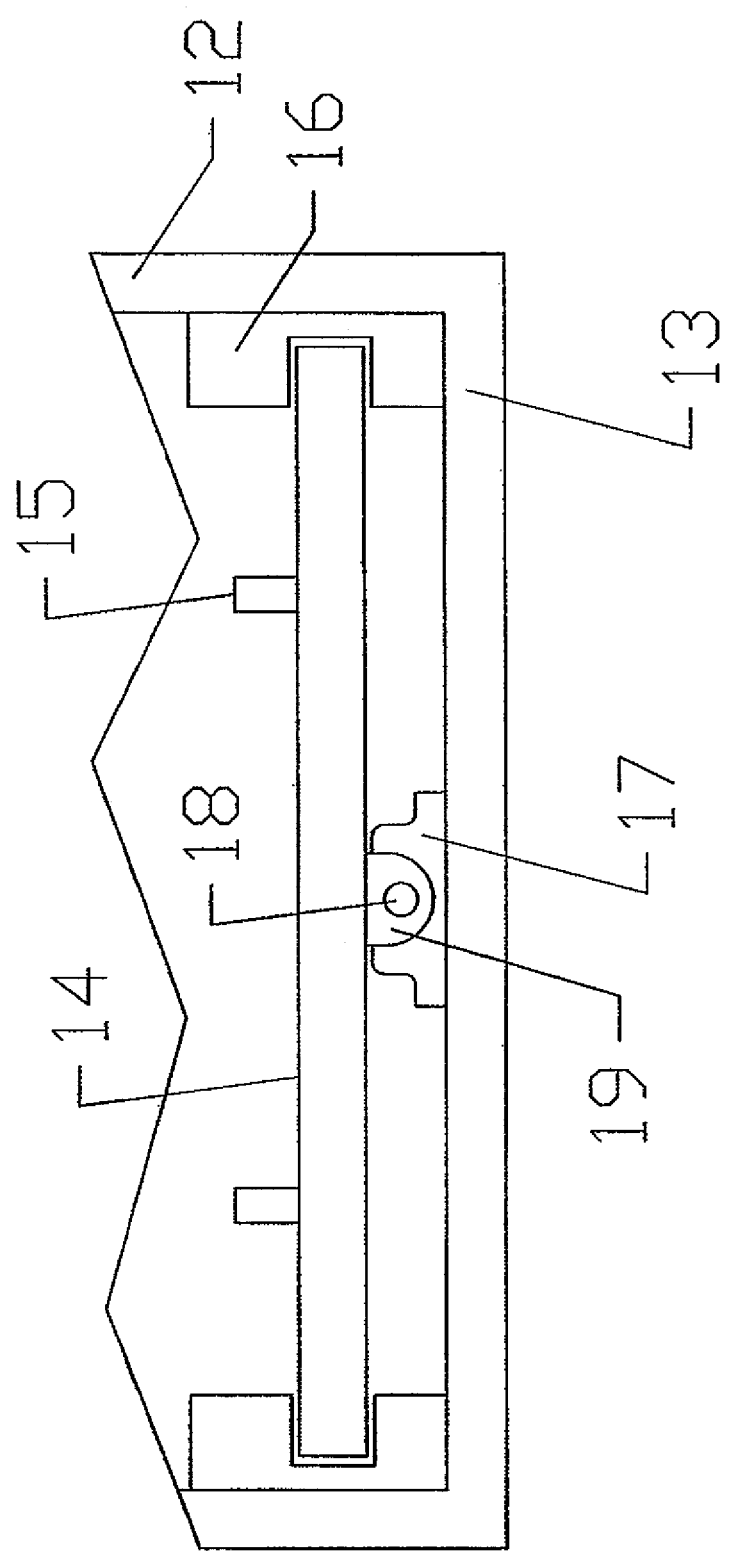

FIGS. 28 and 29 show partial front and a side cross-section views of one non-limiting way in which movable shelf 14 can be mounted and moved within a storage area of a stocker 10. Of course, the same system can also be utilized on the embodiment shown in FIGS. 18-21. The shelf moving system utilizes a motor 17 which can be mounted or fixed to the bottom wall 13, a flange 19 having an internally threaded through opening which is mounted or fixed to the shelf 14, and a screw or externally threaded member 18 which is rotated by the motor 17.

In the position shown in FIG. 29, the motor 17 is rotating in one direction which causes the external threads of the screw member 18 to engage with the internal threads of the flange 19 which, in turn, causes the shelf 14 to move towards the extended position.

After receiving a signal from the control C or alternatively after sensing via sensors mounted to the shelf 14 (not shown) that the substrate carrier 30 is properly positioned on the shelf 14, the motor 17 rotates in an opposite direction which causes the external threads of the screw member 18 to engage with the internal threads of the flange 19 which, in turn, causes the shelf 14 to move back towards a retracted position. Sensors (not shown) can also be utilized to inform the motor 17 or the control C that the shelf 14 is properly positioned in either the extended position or the retracted position or both. The linear movement of the shelf 14 is guided by the guides 16. Of course, the invention contemplates other mechanism for moving the shelves between the retracted position and the extended position.

FIG. 30 shows a top view of a buffer system comprising multiple rows of stockers 10, 100 which receive and store substrate carriers 30 via multiple overhead transporters 20 movably guided on a running rail system 400. The system can, of course, utilize all of the same type of stockers, e.g., 10 or 100, or combinations of different types of stockers 10 and 100 as shown in FIG. 35. Each stocker 10, 100 can be accessed by multiple overhead transporters 20 as shown or merely by one overhead transporter 20 per side. The stockers 10, 100 are arranged substantially parallel to each other have open opposite sides so as to receive substrate carriers 30 from overhead transporters 20 arranged on opposite sides of the stockers 10, 100.

The invention also relates to a method of storing storage devices such as substrate carriers 30. The method includes transferring at least one storage device 30 from at least one overhead transporter 20 to a stocker 10, 100 having a plurality of storage areas 11, 111 and at least one movable support 14, 114. The method also includes controlling a movement of the at least one movable support 14, 114 at least between a first position (e.g., an extended position) wherein the at least one movable support 14, 114 receives the at least one storage device 30 outside one of the storage areas 11, 111 and a second position (e.g., a retracted position) wherein the at least one movable support 14, 114 is arranged substantially within the one of the storage areas 11, 111.

While the invention has been described in terms of embodiments, those skilled in the art will recognize that the invention can be practiced with modifications and in the spirit and scope of the appended claims.

What is claimed:

1. A storage system, comprising:
   at least one stocker comprising a plurality of storage areas each adapted to store at least one storage device, wherein each storage area has a top wall, bottom wall and at least one side wall that are different from the other storage areas;
   at least one movable support attached to each storage area;
   a control controlling movement of the at least one movable support at least between a first position wherein the at least one movable support receives the at least one storage device outside one of the storage areas and a second position wherein the at least one movable support is arranged substantially within the one of the storage areas, wherein the at least one movable support comprises a linearly movable shelf that is structured to directly contact and hold a bottom of the at least one storage device;
   a motor mounted on the bottom wall;
   a threaded flange mounted on a bottom of the linearly movable shelf; and
   a threaded member engaging the threaded flange and rotatable by the motor,
   wherein the at least one movable support is slidably mounted.

2. The system of claim 1, wherein the at least one stocker comprises a plurality of stockers arranged substantially parallel to each other.

3. The system of claim 1, wherein the plurality of storage areas are discrete storage areas arranged in rows and columns.

4. The system of claim 1, wherein the plurality of storage areas are arranged on opposite sides of the at least one stocker.

5. The system of claim 1, wherein the plurality of storage areas are substantially equally sized and arranged in rows and columns.

6. The system of claim 1, wherein each of the plurality of storage areas have open entrance areas.

7. The system of claim 1, further comprising an overhead traveling vehicle or carriage that transfers the at least one storage device directly to the at least one movable support under control of the control.

8. The system of claim 1, wherein the at least one movable support comprises a mechanism that ensures proper positioning of the at least one storage device on the at least one movable support.

9. The system of claim 8, wherein the mechanism that ensures proper positioning comprises at least one projecting member which extends at least partially into a recess arranged on a bottom surface of the at least one storage device.

10. The system of claim 1, wherein the at least one storage device comprises at least one of:
    a substrate carrier;
    a front opening unified pod (FOUP);
    a standard mechanical interface (SMIF) pod;
    a cassette;
    a reticle pod containing reticles; and
    an empty reticle.

11. The system of claim 1, further comprising an overhead traveling vehicle or carriage movably guided by a rail system and adapted to transfer the at least one storage to the at least one movable support under control of the control.

12. The system of claim 1, wherein one of the plurality of storage areas is configured to store one size reticle pods and another of the plurality of storage areas is configured to store another different size reticle pods.

13. The system of claim 1, wherein the at least one movable support of one of the plurality of storage areas comprises a locating pin arrangement adapted to engage with one size reticle pod and the at least one movable support of another of the plurality of storage areas comprises a locating pin arrangement adapted to engage with another size reticle pod.

14. The system of claim 1, wherein at least one of the plurality of storage areas is configured to eliminate contaminants added during a process step or prolong storage.

15. The system of claim 14, wherein the one of the plurality of storage areas is a nitorgen/clean dry air storage area.

16. The system of claim 14, wherein the one of the plurality of storage areas comprises an inert purge area.

17. The storage system of claim 1, wherein the linearly movable shelf extends horizontally out of each storage area to the first position in order to receive the at least one storage device and retracts horizontally to the second position.

18. The storage system of claim 17, wherein each storage area comprises a first guide on the at least one side wall and a second guide on a side wall opposite the at least one side wall, wherein the linearly moveable shelf is positioned inside the first guide and the second guide such that the first guide and the second guide linearly guide the linearly moveable shelf in horizontal movement between the first position and the second position.

19. An overhead transporter accessible storage system, comprising:
- at least one stocker comprising a plurality of storage areas each adapted to store at least one storage device, wherein each storage area has a top wall, bottom wall and at least one side wall that are different from the other storage areas;
- at least one movable support shelf arranged on each storage area; and
- a control controlling movement of the at least one movable support shelf at least between a first position wherein the at least one movable support shelf receives the at least one storage device outside one of the storage areas and a second position wherein the at least one movable support shelf is arranged substantially within the one of the storage areas,
- wherein the at least one movable support shelf comprises a linearly movable shelf that is structured to directly contact and hold a bottom of the at least one storage device,
- further comprising a motor mounted on the bottom wall, a threaded flange mounted on a bottom of the linearly movable shelf, and a threaded member engaging the threaded flange and rotatable by the motor.

20. A method of storing storage devices, the method comprising:
- transferring at least one storage device from at least one overhead transporter to a stocker having a plurality of storage areas wherein a linearly movable shelf is arranged in each storage area; and
- controlling a movement of the linearly movable shelf at least between a first position wherein the linearly moveable shelf receives the at least one storage device outside one of the storage areas by directly contacting and holding a bottom of the at least one storage device, and a second position wherein the linearly moveable shelf is arranged substantially within the one of the storage areas,
- wherein each storage area has a top wall, bottom wall and at least one side wall that are different from the other storage areas,
- each storage area comprises a first guide on the at least one side wall and a second guide on a side wall opposite the at least one side wall, a motor mounted on the bottom wall, a threaded flange mounted on a bottom of the linearly movable shelf, and a threaded member engaging the threaded flange and rotatable by the motor, and
- the linearly moveable shelf is positioned inside the first guide and the second guide such that the first guide and the second guide linearly guide the linearly moveable shelf in horizontal movement between the first position and the second position.

21. The method of claim 20, further comprising controlling the transferring and the movement of the at least one movable support with a control.

22. The method of claim 20, further comprising moving the at least one overhead transporter to a predetermined position for transferring, and thereafter controlling the transferring and the movement of the at least one movable support with a control.

23. The method of claim 20, further comprising controlling, with a control, each of:
- movement of the at least one overhead transporter to a predetermined position;
- the transferring; and
- the movement of the at least one movable support.

24. The method of claim 20, further comprising at least one of:
- positioning the at least one storage device on the at least one movable support in a predetermined position;
- positioning the at least one storage device on the at least one movable support such that the at least one storage device is prevented from moving along at least one degree of freedom;
- positioning the at least one storage device on the at least one movable support such that the at least one storage device is prevented from moving substantially parallel to an upper surface of the at least one movable support; and
- positioning the at least one storage device on the at least one movable support such that the at least one storage device is removably secured to an upper surface of the at least one movable support.

* * * * *